United States Patent [19]

Yanacek et al.

[11] Patent Number: 4,743,642

[45] Date of Patent: May 10, 1988

[54] COLOR BALANCED RUBBER-REINFORCED PLASTIC

[75] Inventors: James A. Yanacek; Robert J. Donald, both of Midland; Christopher S. Murphy, Troy, all of Mich.

[73] Assignee: The Dow Chemical Company, Midland, Mich.

[21] Appl. No.: 905,106

[22] Filed: Sep. 8, 1986

[51] Int. Cl.$^4$ .......................... C08L 55/02; C08K 5/08
[52] U.S. Cl. ..................................... 524/358; 524/110; 524/405; 524/413; 524/469; 524/504; 524/505
[58] Field of Search ............... 524/358, 110, 405, 413, 524/469, 504, 505

[56] References Cited

U.S. PATENT DOCUMENTS

| | | | |
|---|---|---|---|
| 3,172,872 | 3/1965 | Kraus et al. | 524/358 X |
| 3,441,536 | 4/1969 | Dien | 524/358 |
| 3,494,982 | 2/1970 | Grabowski et al. | 260/876 |
| 3,975,410 | 8/1976 | Wick et al. | 260/376 |
| 4,128,396 | 12/1978 | Wick et al. | 8/39 C |
| 4,323,671 | 4/1982 | Neeff et al. | 542/415 |

FOREIGN PATENT DOCUMENTS 56047438  9/1979  Japan.

*Primary Examiner*—Theodore E. Pertilla
*Attorney, Agent, or Firm*—Thomas D. Zindrick

[57] ABSTRACT

A rubber-reinforced polymeric composition is disclosed having enhanced color stability upon exposure to ultraviolet (UV) light comprising a color balancer in an amount effective to reduce the overall color shift of the plastic due to exposure to UV light.

20 Claims, No Drawings

COLOR BALANCED RUBBER-REINFORCED PLASTIC

BACKGROUND OF THE INVENTION

Due to their desirable physical properties such as strength and toughness (i.e., the combination of elongation and impact strength), rubber-reinforced polymer resins are employed in a variety of commercial applications. A deficiency of rubber-reinforced plastic materials made from these resins is their vulnerability to environmental conditions, which causes yellowing of the plastic. In certain applications exposure to a light source having as a component ultraviolet (UV) light, e.g., sunlight or fluorescent lighting, can detract from the appearance of plastic parts by causing discoloration of the resin surface, which is commonly referred to as weathering.

Yellowing of rubber-toughened plastic is particularly critical in markets such as business machine housings and parts. The conversion from metals to plastics has resulted in rubber-reinforced plastic components such as business machine housings, which are vulnerable to the degradative effects of fluorescent lighting and sunlight.

The UV stability of thermoplastic business machine housings is receiving close scrutiny from suppliers of multiple component personal computer systems. By using a resin having good UV stability, a manufacturer is assured that the housing of any peripheral component, e.g., a printer or additional disc drive, added at a later date will match the color of the housing of the original equipment. Consistent color among different business machine housings gives the consumer a strong perception of quality.

Interest in UV stability is also being fueled by pressures to make every aspect of business machines as cost effective as possible. In many cases, this is necessitating a switch from the use of structural foam with a highly UV-stable coating to the use of injection molded housings with integral color for equipment housings.

Before UV can cause any harm, it must first be absorbed. Only certain groups within polymer molecules, called chromophores, accept the energy of the UV light and are transformed into excited state groups. These groups then dispose of the energy. The energy may be transferred to a nearby stabilizer molecule called a quencher, which in turn converts the energy to heat or, less desirably, may break weak chemical bonds with minimal color change.

Limited stabilization can be achieved by several conventional mechanisms. UV absorbers operate largely by competitive absorption. Absorbers convert the absorbed energy into harmless heat. Thus, much less light reaches chromophores in the substrate.

An ideal UV absorber should be extremely photo-stable and have high absorption over the entire UV range from 290 to 400 nanometers (nm).

The 2-hydroxyphenyl benzotriazoles are one class of UV absorbers. The benzophenones are another important and widely used class of UV absorbers whose absorption covers mainly the lower half of the UV range. Products of this latter class tend to be more prone to yellowing under processing or light exposure conditions than 2-hydroxyphenyl benzotriazoles. A third class of UV absorbers include rutile $TiO_2$ metal oxides such as pigment grade titanium dioxide. The benefits of $TiO_2$ are believed to be more than just as a UV absorber. Higher $TiO_2$ concentration in a resin increases the sample opacity thereby hindering the observation of discoloration deeper within the material.

Other classes of UV absorbers, which absorb primarily at the low wavelength end of the UV range, include salicylates, cyanoacrylates, benzylidene, malonates, and oxalarrilides. These are generally less effective than UV absorbers in the first three classes.

Hindered amine light stabilizers (HALS) provide another approach to UV stabilization. These molecules, typically derivatives of tetramethylpiperidines, do not absorb UV light, but are effective scavengers of free radicals, thus acting as photooxidation inhibitors. Synergistic enhancement of stabilizing activity is often achieved by simultaneous use of scavengers and stabilizers, which each act by different mechanisms. When choosing a plastic composition, end users in the past have had to make significant expenditures to achieve ultraviolet light stabilization, or accept an inevitable amount of discoloration. Improved stabilization has been achieved using a combination of $TiO_2$ and a HALS additive. However, due to the cost of the HALS additive, this stabilization combination entails significant expense.

As previously mentioned, quenchers interact with excited states of chromophores to accept the energy transferred and to return the excited chromophore to the stable ground state. Typical quenchers are nickel chelates which can accept energy from excited chromophores. In addition, some of the protective action of this class has been attributed to their hydroperoxide decomposing and radical scavenging ability.

In view of these problems in achieving color stabilization of rubber-reinforced resins, it remains highly desirable to provide an inexpensive additive for rubber resins which minimizes an overall color shift upon exposure of the resin composition to UV light.

SUMMARY OF THE INVENTION

Accordingly, the present invention is a composition comprising a rubber-reinforced plastic containing a yellow color balancer in an amount effective to significantly reduce the overall color shift of the plastic upon exposure to ultraviolet light.

DETAILED DESCRIPTION OF THE INVENTION

Rubber-containing thermoplastics are well known to those in the art and reference is made thereto for the purposes of this invention. Exemplary resins are those toughened plastics manufactured by bulk solution, bulk-suspension or emulsion polymerization, and thermoplastics to which rubber has been blended. Representative thermoplastic materials include polymeric resins derived from one or more monovinylidene aromatic compounds such as styrene and, optionally, one or more monomers copolymerizable therewith, such as an ethylenically unsaturated nitrile. Exemplary rubber-reinforced polymers of this type include high impact polystyrene ("HIPS") and ABS type resins.

In preparing a copolymer matrix, the amounts of the monovinylidene aromatic compound and comonomer most advantageously employed will vary depending on the physical and chemical properties desired in the final rubber-reinforced product. In general, the copolymer matrix will advantageously comprise from about 5 to about 35, preferably about 15 to about 25 weight percent of the comonomer and from about 95 to about 65, preferably from about 85 to about 75 weight percent of the monovinylidene aromatic monomer, said weight percents being based on total polymer weight.

Rubbers useful in preparing rubber-reinforced polymer resins are well-known in the art and reference is made thereto for the purposes of the present invention. Advantageously, the rubber employed in preparing said rubber-reinforced product is a homopolymer or a copolymer of an alkadiene which exhibits a second order transition temperature not higher than about 0° C. and preferably not higher than about −20° C. as determined by conventional methods, e.g., ASTM Test Method D-746-52T. A copolymer of ethylene, propylene and optionally, a nonconjugated diene, or an acrylate rubber can also be employed. Preferably, the rubber is a homopolymer of a 1,3-conjugated diene such as butadiene, isoprene, piperylene, chloroprene or a random block or graft copolymer of said conjugated dienes with one or more comonomers. Suitable comonomers include monovinylidene aromatic compounds such as styrene; α-ethylenically unsaturated nitriles such as acrylonitrile; or α-olefins such as ethylene or propylene. Although the rubber may contain a small amount of crosslinking agent, excessive crosslinking can result in the loss of the rubbery characteristics of the rubber.

Preferred rubbery polymers are the homopolymers of 1,3-butadiene and block or graft copolymers of at least about 55, more preferably from about 65 to about 85, weight percent 1,3-butadiene, and up to about 45, more preferably from about 15 to about 35, weight percent of a monovinylidene aromatic compound, preferably styrene. The rubber is advantageously employed in an amount such that the rubber-reinforced product contains from about 3 to about 20 weight percent rubber. A rubber-reinforced product having from about 5 to about 15 weight percent rubber, based on the total weight of the rubber-reinforced polymer, is preferred.

Techniques suitable for producing the interpolymer of the matrix are well-known in the art. Examples of the known polymerization processes include mass, mass-suspension, mass-solution, suspension, and emulsion polymerization processes as well as other modifications and/or combinations of such processes. See, for example, U.S. Pat. Nos. 3,509,237; 3,928,494; 4,221,883; 4,239,863; 4,243,765; and 4,250,271; which are incorporated herein by reference and teach such processes.

The bulk and emulsion polymerization processes used for incorporating rubbers into styrene-based polymers are not easily adapted for incorporating rubbers into other polymer systems. Direct blending of a rubber with a thermoplastic polymer is another method for incorporating rubbers into thermoplastic polymers. The standard practice is to prepare the resin separately and to add the rubber later. Additionally, grafted rubber concentrate (GRC), i.e., agglomerated particles of emulsion graft polymerized rubbers, may be compounded with bulk and emulsion prepared compositions and utilized as an impact modifier.

For example, polyvinyl chloride (PVC) may be blended with poly(butadiene-co-acrylonitrile), chlorinated polyethylene, grafted ethylene-vinyl acetate (EVA) copolymer, and grafted ethylene-propylene rubber (EPR). Ethylene-propylene diene monomer (EPDM) and EPR can be mechanically blended with polypropylene. Toughening agents may also be made by making a masterbatch of rubber and grafted thermoplastic terpolymer such as acrylonitrile-butadiene-styrene (ABS) or methacrylate-butadiene-styrene (MBS).

Plastic materials can be modified by a variety of substances (FR additives) designed to inhibit ignition or burning characteristics to conform to prescribed standards. This is especially significant in business machine housings. Applicants have found several FR additives add to the discoloration of rubber toughened plastics upon exposure to light having as a component ultraviolet light.

FR additives may interrupt or inhibit one or more of the mechanisms of burning or smoke generation. Some are present as fillers while reactive varieties are introduced into the resin system by chemical reaction. They act by reducing the amount of combustible materials in the product or by interfering chemically with the combustion process either in the vapor or condensed phases.

Among the more common additive-type flame retardants are the halogenated aliphatics, brominated aromatics, halogenated and nonhalogenated organophosphates, and the oxides of aluminum and antimony.

Brominated aromatic compounds are commonly used FR additives for many thermoplastic resins, especially styrenics and polyesters.

Applicants have found that a number of commonly incorporated FR additives increase discoloration of the rubber toughened plastics upon exposure to ultraviolet light. Exemplary of these FR additives are decabromodiphenyl ether, bis(tetrabromophthalimido)ethane, poly(dibromophenylene oxide), tribromophenoxyethane and 1,2-bis(pentabromophenoxy) ethane.

Antimony oxide is unique in that its only value as a flame retardant is in combination with halogen compounds as a synergist. A preferred FR additive comprises 1,2-bis(pentabromophenoxy) ethane and antimony trioxide.

Included in the broad category of FR additives are smoke suppressants. Examples are oxides of boron and molybdenum which are commonly incorporated in PVC.

By "color balancers" is meant any yellow organic dye or yellow organic pigment that will fade upon exposure to light having as a component ultraviolet light. The color balancer may be added to the resin as part of a pre-matched color system or as part of the initial color system. The color balancer may be incorporated into the resin in any conventional manner known to those skilled in the art. Exemplary of such techniques is to mix the resin and the color balancer in an extruder.

The color balancer chosen should be evaluated on the basis of the UV stability of the end product. It does not make lightfast the rubber-reinforced plastic. Rather, the initial yellow of the color balancer fades to generally compensate for the yellowing of the rubber toughened plastic. Consequently, the plastic is not made UV stable, but its overall color shift will be greatly reduced because of the presence of color balancer. The relative amount of color balancer, e.g., dye or pigment, will be dependent on a variety of factors. Such factors include the stability of the dye; the amount of rubber and FR additive in the plastic; and whether the color balancer is included in the initial custom color package, which requires a higher weight percentage than if added to a "prematched" system.

Although any yellow organic dye which fades upon exposure to UV light is a suitable color balancer, anthraquinone dyes have now been found to balance resins very well. Anthraquinone dyes are inherently UV unstable, gradually losing yellow intensity upon exposure.

Exemplary anthraquinone dyes are Yellow AGB obtainable from Amaplast Co., and Soluaperm Yellow G and Solvent Yellow 77 obtainable from the Ferro Compounding Co. A particularly preferred color balancer, 1,8-bis(phenylthio)anthraquinone, is obtainable as Yellow GHS from the Amaplast Chemical Co.

Another particularly preferred color balancer is Macroflex Fl. Y. 10GN, a cumarin dye, obtainable from the Mobay Chemical Company.

Organic dyes may be present in an amount of from about 0.001 to about 0.04, preferably from about 0.001 to about 0.02 weight percent of the rubber-toughened plastic.

Also, suitable as color balancers are yellow organic pigments. Unlike dyes, pigments are generally insoluble and impart color by dispersing throughout the system.

Selection of a pigment should be based on properties known to those in the art. Exemplary of such properties are UV stability, hue, tinting strength, hiding power and melt flow. One suitable organic pigment is Fanchon Yellow, obtainable from the Mobay Chemical Company.

Organic pigments may be present in an amount of from about 0.001 to about 0.1; preferably from about 0.001 to about 0.05; and most preferably from about 0.03 to about 0.05 weight percent of the rubber-toughened plastic.

Liquid colorants are dispersions of pigments in a carrier matrix. Carriers for liquid colorants are blends of surfactants, plasticizers, and other ingredients. Migration or bleed is a function of the pigment showing varying degrees of solubility in the plastic or other substance in contact with the colored plastic. Higher-molecular-weight pigments minimize migration problems.

For the purposes of this invention, a suitable color concentrate is a composition containing a predetermined percent by weight of color balancer, i.e., organic dye or pigment properly dispersed in a carrier resin. The carrier resin is then blended into a letdown resin, which is colored or modified. The amount of color balancer incorporated into a concentrate can vary greatly, reaching as high as 80 percent or more. The weight of color balancer used per weight of letdown resin is called the letdown ratio, which is expressed as unit weight of letdown resin to unit weight of concentrate. Although letdown ratios as high as 200:1 are possible, the best color uniformity is obtained with lower ratios, approximately 50:1 or less.

Color concentrates usually are mixed with the letdown resin by gravimetric proportional feeders at the extruder hopper. Since the letdown ratio is calculated upon a percent-by-weight basis, the same method must be used to determine the proportion of concentrate and natural resin in the mix. In this way, color uniformity will be assured from run to run.

To determine the proper letdown ratio by percent of color balancer in the mix, the following formula is used:

$$\left[ \frac{\% \text{ Color balancer/in Concentrate}}{\% \text{ Color balancer/in Final Part}} - 1 \right] :1$$

The carrier resin contained in the concentrate should be generally the same as or compatible with the letdown resin at the letdown ratios employed. Testing prior to actual application will help determine whether changes in the physical properties of the final product will occur. In general, it is most effective to have a homogeneous distribution of color balancer; this is accomplished by a carrier resin with a melting point slightly lower than the melting point of the letdown resin.

The color balancer may be added singly or in combination with commonly incorporated UV stabilizers. A particularly preferred combination is to incorporate a color balancer and up to 10 percent by weight of $TiO_2$ in the rubber toughened plastic.

Color shift is the discoloration or change in hue of a plastic exposed to UV radiation. Color shift can be measured by a color variation parameter, delta E ($\Delta E$). Essentially this parameter is a measure of the color difference between an experimental sample and a control sample of the same formulation. Hunter color scales for grayness (L), red/green (a), and yellow/blue (b) are described by K. S. Hunter in "Photoelectric Color Difference", Journal of the Optical Society of America, JOSAA, Vol. 12, No. 12, December, 1958, pp. 985–995. Delta E, the total color variation, is calculated by the following formula:

$$\Delta E = (L - Lo)^2 + (a - ao)^2 + (b - bo)^2$$

where L, a, and b are the color values of the UV exposed experimental sample and Lo, ao, and bo are color values of an unexposed control sample stored in a dark environment, creating initial delta values of zero. Lower $\Delta E$ values mean less variation from the control sample values and less discoloration.

Delta E, however, gives no indication as to how the color is shifting. Therefore, additional parameters for measuring color change include L, a or b versus exposure time.

Weatherometers subject samples to accelerated weathering conditions. Various weatherometers are commercially available to evaluate the ultraviolet stability of rubber-reinforced plastics as measured by $\Delta E$.

One suitable weatherometer is the Xenon Arc Ci65 Weatherometer (Xenon Arc), available from the Atlas Electrical Devices Company. This weatherometer utilizes a boro-silicate inner filter and a soda lime glass outer filter; an irradiance output of 0.35 watts per square meter; and a temperature of 55° C. Subjecting a plastic resin to an exposure time of 300 hours at a continual 1.0 revolutions per minute (RPM) in the Xenon Arc Ci65 Weatherometer is designed to simulate approximately 5–7 years of "typical" indoor UV exposure. An exposure time of 100 hours is often sufficient to test the commercial acceptability of rubber-reinforced plastic compositions.

Another suitable weatherometer is the HPUV Indoor Actinic Exposure System (HPUV), also available from the Atlas Electric Devices Company. This weatherometer utilizes eleven 1500 MA cool white flourescent lamps and two filtered 430 MA flourescent sunlamps. Subjecting a plastic resin to an exposure time of 300–400 hours in the HPUV Indoor Actinic Exposure System is designed to simulate 3–5 years of "typical" indoor UV exposure. An exposure time of 100 hours in the HPUV Actinic Exposure System is often sufficient to test the commercial acceptability of rubber-reinforced plastic compositions.

Because of the different weathering methods used in weatherometers, e.g., the Xenon Arc as compared with the HPUV, assessment of the UV stability of a rubber-reinforced plastic is highly dependent on the type of weatherometer utilized. An acceptable delta E recorded in one weatherometer does not ensure a similarly acceptable delta E being recorded in a weatherometer employing a different weathering method.

The following examples are presented for the purpose of illustration only. The features and advantages of the present invention are not limited to these examples. All parts and percentages are by weight unless otherwise indicated.

EXAMPLES 1–4

An ABS resin prepared by mass polymerization is available as 342EZ* from The Dow Chemical Company. 42EZ is 56.5 percent of the rubber-modified plastic comprising a continuous polymer phase consisting of 8.75 percent styrene, and 20.5 percent acrylonitrile; dispersed throughout the polymer matrix is polybutadiene in an amount of 9.25 percent.

*Trademark of The Dow Chemical Company

By emulsion polymerization, a grafted rubber concentrate (GRC) is prepared having a composition of 41.6 percent styrene, 41.0 percent butadiene, 16.7 acrylonitrile. The GRC, used as an impact modifier, comprises 5 percent of the rubber-modified plastic.

A colorant, sold under the tradename of IBM Pearl White by the Ferro Compounding Co., is incorporated in the composition. The colorant is 4.8 percent of the composition, and it was let down at a 20:1 ratio.

Titanium dioxide is added to composition in a 6 percent concentration.

With the ABS, GRC, and colorant are mixed and melt blended the following additives: chlorinated polyethylene fire-resistant additive and synergist, additional stabilizers and lubricants.

Various concentrations of a color balancer, Yellow GHS, is melt blended in an 8.8 twin extruder. The color balancer is added after the color concentrate. A double pass, with tumble blending prior to both the initial and final pass, is utilized to enhance dispersion. A temperature profile of 165° at the feed end and 204° C. at the die end is utilized.

Pelletized formulations are dried for two hours at approximately 165° F. prior to sample molding. Two-inch by three inch and one-half inch by eleven-hundreths inch plaques are molded on a Negri-Bossi injection molder. The barrel temperature profile used is 210° C. at the feed end and 218° C. at the die end.

Moldings having various levels of Yellow GHS are evaluated for color variation using a reflectance spectrophotometer and the aforementioned Hunter color scales.

Early in the test, an initial bleaching of the sample is ordinarily observed (shown by a negative $\Delta B$). After this phenomena, the sample yellowing begins. Delta E is used to monitor the overall color shift. Further, since the main discoloration resulting from UV exposure is in the yellow hue, or the blue/yellow scale, $\Delta B$ is monitored. Finally, yellowing is found to occur quite linearly with time, therefore, slopes of $\Delta B$ versus time (following the initial bleaching) were measured for comparison of various systems' behavior.

The results of the color variation parameter for moldings of various percent GHS based on the total weight of material are set forth in Table I.

TABLE I

| | | Xenon Arc (1) | | | HPUV (2) | | |
|---|---|---|---|---|---|---|---|
| Example | % GHS | Final $\Delta E$ | Final $\Delta B$ | $\Delta B$/100 Hrs | Final $\Delta E$ | Final $\Delta B$ | $\Delta B$/100 Hrs |
| 1 | 0% | 1.57/1.46 | 1.49/1.40 | 0.60/0.65 | 0.89 | 0.85 | 0.32 |
| 2 | 0.01 | 0.37/0.42 | 0.30/0.33 | 0.32/0.35 | 0.14 | 0.09 | 0.14 |
| 3 | 0.02 | 0.72/0.69 | −0.71/−0.68 | — | 0.65 | −0.62 | −0.12 |
| 4 | 0.04 | 2.29/2.29 | −2.24/−2.24 | — | 1.81 | −1.75 | −0.50 |

(1) Samples of rubber-reinforced plastic with varying concentrations of color balancer are weathered using a Xenon Arc Ci65 Weatherometer available from the Atlas Electric Devices Company. This instrument utilizes a boro-silcane inner filter and a soda lime glass outer filter; an irradiance output of 0.30 watts per square meter; and a temperature of 55° C. While being rotated in the instrument at 1 revolution per minute (rpm), samples are weathered for 300 hours, which simulates 3–5 years of UV exposure in an actual office environment.
(2) Samples of rubber-reinforced plastic with varying concentrations of color balancer are weathered using a HPUV Indoor Actinic Exposure System, available from the Atlas Electric Devices Company. This instrument utilizes 11 1,500 MA cool white flourescent lamps and two filtered 430 MA flourescent sunlamps. Depending on the intensity or age of the lamps, samples are 300–400 hours, which simulates 3–5 years of UV in an actual office environment.

As seen by the results in Table I, improved weathering as determined by $\Delta E$ and $\Delta B$ is achieved by the color balancer, in the form of a yellow organic dye, in an amount below 0.04 percent.

EXAMPLES 5–7

Using the techniques of Example 1, an identical fire-retardant, colored, rubber-modified plastic material is prepared, except that Applicants employed various concentrations of NCR Gray concentrate, a colorant obtained from the Reed Chemical Company.

TABLE II

| | | Xenon Arc (1) | | | HPUV (2) | | |
|---|---|---|---|---|---|---|---|
| Example | % GHS | Final $\Delta E$ | Final $\Delta B$ | $\Delta B$/100 Hrs | Final $\Delta E$ | Final $\Delta B$ | $\Delta B$/100 Hrs |
| 5 | 0% | 1.24/1.21 | 1.15/1.13 | 0.61/0.60 | 1.37 | 1.28 | 0.61 |
| 6 | 0.002 | 0.80/0.83 | 0.72/0.75 | 0.45/0.46 | 1.06 | 0.98 | 0.49 |
| 7 | 0.01 | 0.34/0.41 | −0.31/−0.38 | 0.26/0.26 | 0.26 | 0.17 | 0.31 |

(1) Same as Footnote 1 in Table I.
(2) Same as Footnote 2 in Table I.

As seen by the results in Table II, improved weathering as determined by $\Delta E$ and $\Delta B$ is achieved by the addition of a color balancer, in accordance with the teachings of this invention.

EXAMPLES 8–10

Using the technique of Example 1, an identical fire-retardant, colored rubber-modified plastic material is prepared except that Applicants employed various concentrations of IBM Shell Gray concentrate a colorant obtained from the Ferro Compounding Company.

TABLE III

| Example | % GHS | Xenon Arc (1) Final ΔE | Final ΔB | ΔB/100 Hrs |
|---|---|---|---|---|
| 8 | 0% | 0.77/0.83 | 0.76/0.81 | 0.25/0.27 |
| 9 | 0.005 | 0.44/0.44 | 0.42/0.41 | 0.15/0.16 |
| 10 | 0.015 | 0.33/0.30 | −0.23/−0.16 | 0.00/0.04 |

(1) Same as Footnote 1 in Table I.

As seen by the results in Table II, improved weathering as determined by ΔE and ΔB is achieved by the addition of a color balancer in accordance with the teachings of this invention.

EXAMPLES 11–12

Using the techniques of Example 1, an identical fire-retardant, colored, rubber-modified plastic is prepared except that Applicants employed, in the original dry blend color match, various concentrations of IBM Pearl White a colorant available from the Reed Chemical Company.

TABLE IV

| | | Xenon Arc (1) | | | HPUV (2) | | |
|---|---|---|---|---|---|---|---|
| Example | % GHS | Final ΔE | Final ΔB | ΔB/100 Hrs | Final ΔE | Final ΔB | ΔB/100 Hrs |
| 11 | 0% | 1.03/1.09 | 0.98/1.04 | 0.42/0.45 | 1.26 | 1.20 | 0.44 |
| 12 | 0.01 | 0.66/0.60 | 0.63/0.57 | 0.32/0.29 | 1.07 | 1.03 | 0.39 |

(1) Same as Footnote 1 in Table I.
(2) Same as Footnote 2 in Table I.

As seen by the results in Table II, improved weathering as determined by ΔE and ΔB is achieved by the addition of a color balancer, a yellow organic dye, in the original color package.

What is claimed is:

1. A composition comprising a rubber-reinforced plastic composition containing an FR additive being capable of inhibiting ignition or burning characteristics of the plastic composition, and a fadeable, yellow color balancer, said color balancer being selected from the group consisting of an organic dye and an organic pigment, and being present in an effective amount within the range of 0.001 and 0.1 weight percent, whereby the overall color shift ΔE of the composition is reduced upon exposure to light having as a component, ultraviolet light.

2. A composition of claim 1, wherein the overall color shift of the rubber-reinforced plastic will be less than 2.0 ΔE after being subjected to accelerated weathering conditions for 100 hours at 55° C. in a Xenon Arc Ci65 Weatherometer.

3. A composition of claim 1, wherein the overall color shift of the rubber-reinforced plastic will be less than 1.0 ΔE after being subjected to accelerated weathering conditions for 300 hours at 55° C. in a Xenon Arc Ci65 Weatherometer.

4. A composition of claim 1, wherein the overall color shift of the rubber-reinforced plastic will be less than 2.0 ΔE after being subjected to accelerated weathering conditions for 100 hours in a HPUV Indoor Actinic Exposure System.

5. A composition of claim 1, wherein the overall color shift of the rubber-reinforced plastic will be less than 1.0 ΔE after being subjected to accelerated weathering conditions for 300 hours in a HPUV Indoor Actinic Exposure System.

6. The composition of claim 1, wherein the organic dye is present in an amount of from about 0.001 weight percent to about 0.02 weight percent.

7. The composition of claim 1, wherein the organic dye is an anthraquinone dye.

8. The composition of claim 7, wherein the organic dye is 1,8-bis(phenylthio)anthraquinone.

9. The composition of claim 1, wherein the organic pigment is present in an amount of from about 0.001 weight percent to about 0.05 weight percent.

10. The composition of claim 9, wherein the organic pigment is present in an amount of from about 0.03 weight percent to about 0.05 weight percent.

11. The composition of claim 1, further comprising a pigment grade $TiO_2$ in an amount of up to about 10 weight percent.

12. The composition of claim 1, wherein the FR additive is 1,2-bis(pentabromophenoxy)ethane and antimony trioxide.

13. A method of reducing the overall color shift, ΔE, of a rubber-reinforced plastic composition containing an FR additive to be exposed to light having as a component ultraviolet light, said FR additive being capable of inhibiting ignition or burning characteristics of the plastic composition, wherein the method comprises incorporating into the composition a fadeable, yellow color balancer being selected from the group consisting of an organic dye and an organic pigment, and being present in an effective amount within the range of 0.001 and 0.1 weight percent.

14. The method of claim 13, wherein the organic dye is present in an amount of from about 0.001 weight percent to about 0.02 weight percent.

15. The method of claim 13, wherein the organic dye is an anthraquinone dye.

16. The method of claim 15, wherein the anthraquinone dye is 1,8-bis(phenylthio)anthraquinone.

17. The method of claim 13, wherein the organic pigment is present in an amount of from about 0.001 weight percent to about 0.05 weight percent.

18. The method of claim 17, wherein the organic pigment is present in an amount from about 0.02 weight percent to about 0.05 weight percent.

19. The method of claim 13, wherein the composition further comprises a pigment grade $TiO_2$ in an amount of up to about 10 weight percent.

20. The method of claim 13, wherein the FR additive is 1,2-bis(pentabromophenoxy)ethane and antimony trioxide.

* * * * *